United States Patent
Williams (10) Patent No.: US 10,679,452 B2
(45) Date of Patent: Jun. 9, 2020

(54) METHOD AND APPARATUS HAVING MULTIPLE IDENTIFIERS FOR USE IN MAKING TRANSACTIONS

(75) Inventor: Emrys J. Williams, Milton Keynes (GB)

(73) Assignee: Oracle America, Inc., Redwood City, CA (US)

( * ) Notice: Subject to any disclaimer, the term of this patent is extended or adjusted under 35 U.S.C. 154(b) by 2548 days.

(21) Appl. No.: 10/654,733

(22) Filed: Sep. 4, 2003

(65) Prior Publication Data

US 2005/0055316 A1    Mar. 10, 2005

(51) Int. Cl.

| | |
|---|---|
| *G07F 7/10* | (2006.01) |
| *G06Q 20/36* | (2012.01) |
| *G06Q 20/34* | (2012.01) |
| *G06Q 20/40* | (2012.01) |
| *G06Q 20/24* | (2012.01) |
| *G07F 7/12* | (2006.01) |

(52) U.S. Cl.
CPC .......... *G07F 7/1008* (2013.01); *G06Q 20/24* (2013.01); *G06Q 20/341* (2013.01); *G06Q 20/367* (2013.01); *G06Q 20/40* (2013.01); *G06Q 20/4093* (2013.01); *G06Q 20/4097* (2013.01); *G07F 7/122* (2013.01)

(58) Field of Classification Search
USPC .................. 705/75, 50, 65; 235/380, 487
See application file for complete search history.

(56) References Cited

U.S. PATENT DOCUMENTS

| | | | | |
|---|---|---|---|---|
| 4,511,970 | A | * | 4/1985 | Okano et al. .................... 705/41 |
| 5,649,118 | A | * | 7/1997 | Carlisle et al. ................. 705/41 |
| 5,739,512 | A | * | 4/1998 | Tognazzini .................... 235/380 |
| 6,327,578 | B1 | | 12/2001 | Linehan |
| 6,422,462 | B1 | | 7/2002 | Cohen |
| RE38,137 | E | * | 6/2003 | Wynn .......................... 235/487 |
| 6,636,833 | B1 | * | 10/2003 | Flitcroft ................. G06Q 20/00 235/380 |
| 6,738,749 | B1 | * | 5/2004 | Chasko .......................... 705/17 |
| 7,136,835 | B1 | * | 11/2006 | Flitcroft ................. G06Q 20/00 705/39 |
| 2002/0073044 | A1 | * | 6/2002 | Singhal .......................... 705/64 |
| 2002/0120583 | A1 | * | 8/2002 | Keresman et al. ............. 705/65 |
| 2003/0120527 | A1 | * | 6/2003 | Palomo .................. G06Q 10/10 705/2 |

(Continued)

OTHER PUBLICATIONS

David Appell, "Getting Under Your Skin," Scientific American, Jan. 2003, pp. 10-11.

*Primary Examiner* — Chinedu C Agwumezie
(74) *Attorney, Agent, or Firm* — Robert C. Kowert; Kowert, Hood, Munyon, Rankin & Goetzel, P.C.

(57) ABSTRACT

A payment device is provided for use in transactions such as credit purchases at a retail store. The device includes a non-volatile memory containing a set of multiple identifiers that are associated with a customer account. The multiple identifiers are also known to an agency that provides the customer account. The device further includes a processor operable to select one identifier out of the set of multiple identifiers for use with any particular transaction involving the device and the customer account. This identifier is then conveyed from the device, typically via a store terminal, to the agency that maintains the account.

20 Claims, 5 Drawing Sheets

(56) References Cited

U.S. PATENT DOCUMENTS

| | | | |
|---|---|---|---|
| 2004/0059682 A1* | 3/2004 | Hasumi | G06Q 20/04 705/64 |
| 2005/0001027 A1* | 1/2005 | Bahar | 235/382 |
| 2005/0246292 A1* | 11/2005 | Sarcanin | 705/67 |
| 2005/0247777 A1* | 11/2005 | Pitroda | G06Q 20/02 235/380 |
| 2006/0122943 A1* | 6/2006 | Mann et al. | 705/65 |
| 2006/0218098 A1* | 9/2006 | Walker et al. | 705/50 |

* cited by examiner

METHOD AND APPARATUS HAVING MULTIPLE IDENTIFIERS FOR USE IN MAKING TRANSACTIONS

FIELD OF THE INVENTION

The present invention relates to making transactions, such as retail purchases, and to a device that can be used in such transactions.

BACKGROUND OF THE INVENTION

Credit companies need to be confident that a credit transaction is being made by the authorised user of the credit account, who is their customer. This is normally achieved by providing the customer with a plastic credit card, which the customer then signs. The credit card may have embedded technology such as a hologram that makes the card itself hard to forge, although this is of little benefit if the card is lost or stolen. Unfortunately, it is sometimes possible for criminals to forge the signature on the credit card, thereby subverting the primary protection mechanism. One known counter-measure against such forgery is to add a PIN to the card. However, this then requires the customer to remember the PIN. Having to provide a signature and/or to enter a PIN at a store checkout also makes for a relatively cumbersome transaction procedure (and so may lead to increased queues).

A further problem with conventional credit cards concerns individual privacy. Thus such credit cards generally bear the name of the cardholder, and so disclose the identity of the customer to the merchant involved in the transaction. Repeated use of a credit card at a store then allows the merchant to build up a growing record of the customer, based on purchase patterns, and so on. This can be linked to the identity of the purchaser and assessed using data mining techniques and the like. Many customers however would prefer that merchants were not able to collect such information, and indeed their right to privacy may be recognised under data protection laws. Such customers would like to maintain their anonymity as much as possible while making credit transactions. However, this is not feasible with conventional credit cards.

SUMMARY OF THE INVENTION

Accordingly, one embodiment of the invention provides an apparatus or device for use in transactions such as consumer retail purchases. The device includes a non-volatile memory containing a set of multiple identifiers associated with a customer account. The multiple identifiers are also known to an agency providing the customer account. The device further includes a processor. In a transaction, the processor is operable to select one identifier from the set of multiple identifiers for use with the transaction.

By having multiple identifiers on a single device (rather than say a single card number) it becomes feasible for the bearer of the device to maintain their anonymity in relation to the merchant with whom the transaction is being made. In particular, it is assumed that the number of identifiers on a card is large compared to the number of transactions typically made by a customer at a single merchant, and that that the different identifiers cannot be related to each other. In these circumstances, it is not possible for the merchant to link together successive transactions by a single customer, since they will have different selected identifiers. Consequently, the merchant is unable to build up any record of the pattern of purchases by the customer.

The agency providing the customer account needs to determine the account associated with a transaction, in order to bill or allocate the transaction to the proper account. This can be achieved by the agency storing the complete set of identifiers for the device. When a transaction is received, the agency determines the customer account involved from the selected identifier. More particularly, the agency computer system generally maintains an index that allows it to map from a received identifier for a transaction to the corresponding customer account to which the transaction will be allocated.

In one embodiment, each of the identifiers in the set of multiple identifiers is unique to the customer device (for that particular agency). This then allows a direct mapping to be provided from received identifier to customer account. However, the identifier could potentially be combined with some other piece of information in order to ascertain the customer account involved, assuming that this additional information did not compromise the customer identity. One possibility is that the additional information represents the month of account creation. This is sufficiently general to be shared by many customers, yet at the same time would allow some repetition of identifiers between accounts having different creation dates (thereby reducing the overall number of separate identifiers that the agency needs to maintain). Note also that the identifiers (for all accounts) should generally be sparsely distributed over the space of all possible identifiers. This then makes it unlikely that a randomly guessed value represents a legitimate identifier.

In one embodiment, the device includes a communications facility to provide a wireless (such as RF, infrared, etc) or a wired link to an external device such as a shop checkout terminal. This then allows the device to be used in conjunction with the terminal in order to make a transaction. In a typical procedure, the device first engages the terminal, in order to establish a communications link therewith. The link allows the device to receive bill details for a transaction from the terminal. The device now generates a transaction record from the bill details. The transaction record includes the relevant bill details and also the selected identifier for the transaction. The transaction record is then transmitted from the device to the terminal, which forwards it to the agency that provides the customer account. Typically the terminal will then receive authorisation or confirmation back from the agency that the transaction can proceed.

Various measures may be taken to protect these communications. For example, the device may encrypt the transaction record, and also provide it with a digital signature. This then prevents the transaction record from being tampered with by a corrupt merchant. Conversely, the merchant may append its own version of the bill details to the transaction record forwarded to the agency (again, potentially protected by encryption and/or a digital signature). These bill details can then be checked by the agency against those in the transaction record generated on the device, to ensure that the device and the terminal agree on the bill in question.

Typically two types of terminal are provided. A first class of terminals is used for making a transaction, such as a normal credit purchase described above, while a second class of terminals may be used to enter or update account information stored in the non-volatile memory of the device, for example when an account is first opened. It is important that the terminals used to perform a transaction do not accidentally damage the account information. In one embodiment, this is achieved by the device having first and second power circuits. These are then activated by the first and second class of terminals respectively. Activation of the first power circuit does not allow account information to be entered or updated in at least certain portions of the non-volatile memory. Accordingly, the account information is protected against the possibility of corruption while performing a routine transaction.

In one embodiment, the apparatus is provided within inert packaging to allow implantation into a human body. It should be noted that such an implant itself does not directly identify the bearer (this may be of concern to some people, for reasons of privacy); rather, only the agency is able to link the various identifiers stored in the implant to a particular customer account.

The use of an implant for a transaction device has certain advantages for the bearer of the device. For example, the device cannot be forgotten, lost or stolen, once implanted into the bearer. Furthermore, assuming that the identity of the customer is properly demonstrated at implantation time, or when an account is opened on the device, there is no need for any subsequent identity check during routine transactions. In other words, the bearer of the device simply presents their implant to a terminal, and it can be assumed that he or she is indeed the person entitled to perform transactions on the relevant customer account. Consequently, there is no need for the customer to provide a signature or a PIN. This therefore makes for a very streamlined transaction procedure.

In order to ensure that the anonymity of the device bearer is properly maintained, the device may incorporate various safeguards to prevent the entire set of identifiers being read out. (This set of identifiers is presumed unique to the device bearer, at least with respect to the agency concerned, and so could therefore potentially be used to identify him or her). One option is for the region of non-volatile memory in which the identifiers are stored to be generally inaccessible to external devices. Furthermore, the maximum transaction rate of the device may be limited. This then prevents a terminal from trying very rapidly to perform many (phoney) transactions, simply to discern as many identifiers as possible from the device.

The procedure for opening an account for a transaction device typically includes the device interacting with the second class of terminal described above. This terminal in turn is linked to a computer system for the agency that offers the desired account. To open the account, a customer record is created in the agency computer system. The set of multiple identifiers to be used for transactions on the account is then generated, and stored in both the portable transaction device and also the agency computer system. For the latter system, this will normally also involve updating the index of identifier to account mappings. In addition, the transaction device and the agency computer system can exchange cryptographic keys for use in communications on the account (and for use in digital signatures). These keys may be newly generated for this particular account, or existing keys may be utilised.

The identifiers may be generated either by the agency computer system or by the device itself, and then supplied for storage to the other party. However, there are certain advantages in performing the generation at the agency computer system, as opposed to on the portable device. Thus the agency computer system generally has more computational power, and can check straightaway that the newly generated identifiers are unique to this customer account.

Furthermore, as discussed above, for security reasons it is beneficial if the device does not support any facility for the mass read-out of identifiers.

The above approach allows transactions to be authorised in a secure manner yet without disclosing the identity of the customer to the merchant or retail store involved in the transaction. In general, the customer identity will be known by the credit agency or other organisation that maintains the customer account. This then allows expenditure on the account to be billed to the relevant person. However, in one implementation, it is possible for the customer to remain anonymous from all parties involved. Thus the customer may make a prepayment onto the account prior to using the account for transactions. The customer is then able to make transactions that debit from the account, up to the limit of the prepaid account. Typically it is possible for the customer to make further prepayments onto the account, in order to top it up again at a later date. With this approach, the customer account is always in credit. Consequently, the agency does not necessarily need to know the identity of the customer, since they never have to issue any bill to them.

In accordance with another embodiment of the invention, there is providing a method of making a transaction using a device (whether an implant or some portable device, similar perhaps to a smart card). The method involves storing within the device a set of multiple identifiers associated with a customer account. These identifiers are also known to an agency that provides the customer account. When making a transaction, one identifier is selected from the set of multiple identifiers for use with the transaction.

In accordance with another embodiment of the invention, there is provided a method for performing a transaction at a terminal using a portable transaction device. The method involves generating a bill for the transaction at the terminal; engaging the portable transaction device with the terminal; and transmitting the bill from the terminal to the transaction device. One identifier from a set of multiple identifiers stored on the transaction device is then selected for use in the transaction, and a transaction record is generated on the transaction device. The transaction record incorporates information from the bill and the selected identifier. The device then transmits the transaction record to the terminal.

Typically, the transaction device is associated with a customer account, and the multiple identifiers are also known to an agency providing the customer account. The method then further comprises transmitting the transaction record from the terminal to an agency computer, and accessing an account record for the customer account based on the selected identifier included in the transaction record. The agency computer now validates the transaction, for example by verifying any digital signature in the transaction record, and confirming that the account is still operational (and has sufficient credit available). This then allows the agency computer to send an appropriate authorisation or confirmation back to the terminal, and to update the account record in respect of the validated transaction.

In accordance with another embodiment of the invention there is provided a method of operating a computer account system at an agency. The agency maintains a plurality of customer accounts on the computer account system. Each customer account has a set of multiple identifiers associated with it. The method involves receiving a request for a transaction on a customer account, and accessing an identifier within the request. This then allows the agency computer to determine which set of multiple identifiers the accessed identifier belongs to, and from this to determine the appropriate customer account for the transaction. Consequently, the correct customer account can now be updated in respect of the transaction.

In accordance with another embodiment of the invention, there is provided a computer account system at an agency. The system includes a database for storing a plurality of customer account records. Each customer account record incorporates an associated set of multiple identifiers. The system further includes an index that maps identifiers to corresponding account records. When the system receives a request for a transaction on a customer account, it accesses an identifier within the request in order to determine which set of multiple identifiers the received identifier belongs to. From this, it can determine the customer account that is involved in this particular transaction.

The transaction device has been described so far in the context of financial transactions, such as credit purchases. Nevertheless, it will be appreciated that it may be used in a wider range of circumstances. One possibility, for example, is as a device that permits access to a firm's premises (analogous to the swipe cards commonly used today). It is assumed here that a firm employs a subcontractor to provide various services, and the devices are then issued to the staff of the subcontractor. In this arrangement, the firm provides the access terminals, but these then communicate with the subcontractor's computers for authorisation of a transaction (i.e. an entrance request by one of the subcontractor staff). As a result, the firm is unable to track the movements of individual subcontractor staff, such as when particular people arrive at or leave from the premises. The skilled person will be aware of many other circumstances in which a transaction device such as described herein may be employed.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 1:
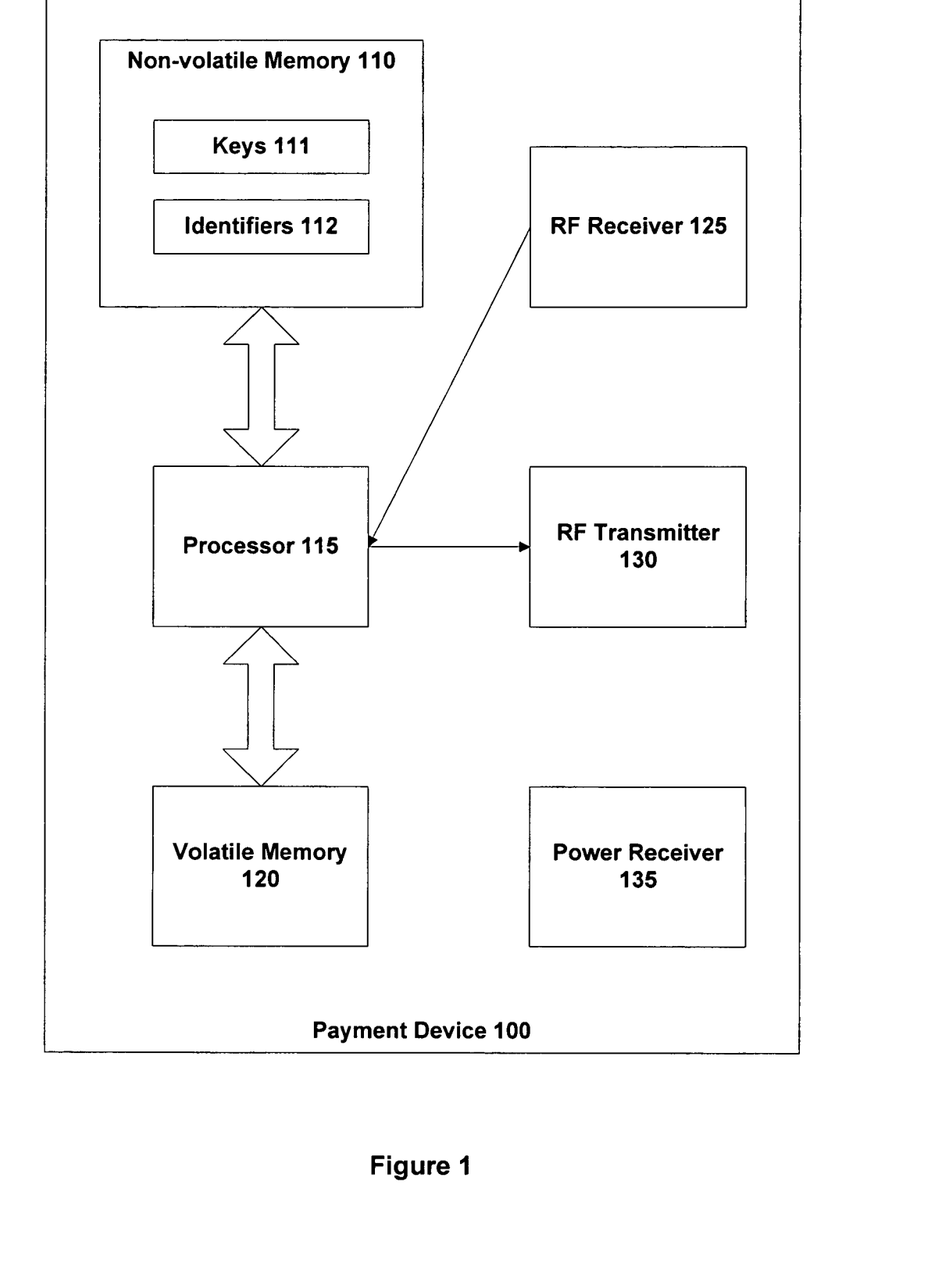
FIG. 1 is a schematic diagram of a payment device in accordance with one embodiment of the invention.

FIG. 1 illustrates in schematic form a payment device 100 in accordance with one embodiment of the invention. The payments device includes a processor 115, which is linked to volatile memory 120 (typically RAM), and also to non-volatile memory 110, typically EPROM, such as flash memory. Note that a certain portion of non-volatile memory 110 may be made read only (i.e. ROM rather than PROM). Cryptographic keys 111 and identifiers 112, as described in more detail below, are stored within non-volatile memory 110.

Payment device 100 further incorporates a facility to communicate with the outside world. In the embodiment of FIG. 1 this is provided by an RF receiver 125 and an RF transmitter 130. If desired, these could be combined into a single transceiver. Other forms of communication could also be provided instead of (or as well as) the RF devices, such as an infrared link. Similarly, payment device 100 may be formed with a suitable connector for enabling a wired communications link, such as over a Universal Serial Bus (USB).

In the embodiment shown in FIG. 1, payment device 100 does not include any permanent power supply. Rather, a power receiver 135 is provided that can receive power using inductive coupling from an external AC magnetic field. Typically this magnetic field is supplied by a terminal with which the payment device 100 is being used. (When the device is not being used in a terminal, it has no need of power). However, any other appropriate power mechanism could be used for payment device 100, such as by including within the payment device a battery, a solar (or more generally light) power converter, and so on.

Note that the various hardware components shown in the embodiment of FIG. 1 are illustrative only, and are likely to vary from one implementation to another. For example, the communications performed by the payment device are generally encrypted. Accordingly, payment device 100 may incorporate a dedicated hardware encryption/decryption unit. Alternatively such encryption and decryption may be performed by the processor 115, or in the RF receiver 125 and RF transmitter 130 (as appropriate).

In one embodiment, payment device 100 is provided as an implant, to be inserted into a convenient location on the human body. Various possible sites include the back of the hand, the forearm, the shoulder, and so on. One advantage of using an implant for payment device 100 is that it is then impossible to forget or to lose the payment device.

Note that dogs and other animals already routinely have implants for identification purposes. In particular, a vet can implant a chip into a dog by making a small incision in its skin. The chip, comprising a compact, inert package, is inserted under the skin of the dog, in order to provide a means of identification, should the dog become lost. Each chip carries a unique number, which can be read through a serial protocol over an RF link to an external reader. (The implanted chips are generally powered up by inductive coupling to an AC magnetic field supplied by the reader).

When a chip is implanted, the vet registers in a global database the unique number of the implant and the address of the dog's owner. Any new arrivals at a dog pound can then be scanned for implanted chips. If one is found, the unique number is retrieved and used to determine the registered owner from the global database. This allows the dog to be restored to its proper owners. Typically two chips are implanted into a dog, so as to provide redundancy in case one of the chips fails.

It will be appreciated that payment device 100 can be based on such veterinarian implants, supplemented with additional functionality as appropriate. In particular, payment device 100 supports the ability to program non-volatile information into the implanted chip once it is inside a carrier. Furthermore, payment device 100 generally has additional processing power compared to a typical existing dog implant. The skilled person will be well aware of how such additional functionality may be implemented.

On the other hand, in some embodiments, payment device 100 is not physically implanted into the holder. In this case, payment device 100 may typically be implemented by a smart card, such as a Javacard device (Javacard is a trademark of Sun Microsystems Inc.). Smart cards are well-known in the art, and are generally the subject of the ISO 7816 family of international standards. Further information about Javacard is available from the page: /products/javacard/ at the web site: http://java.sun.com, and from the site: http://www.javacardforum.org/. (It will be appreciated that some or all of the smart card architecture may also be used even if payment device 100 is provided as an implant).

Figure 2:
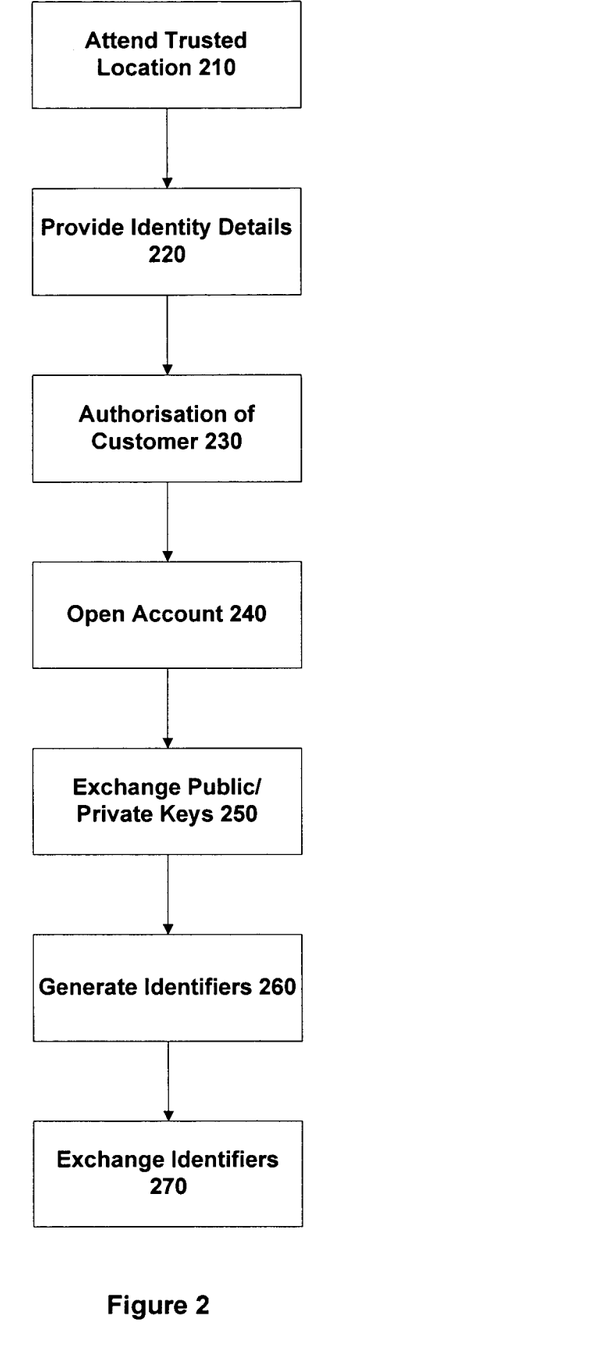
FIG. 2 is a flowchart illustrating opening an account in accordance with one embodiment of the invention.
Figure 3:
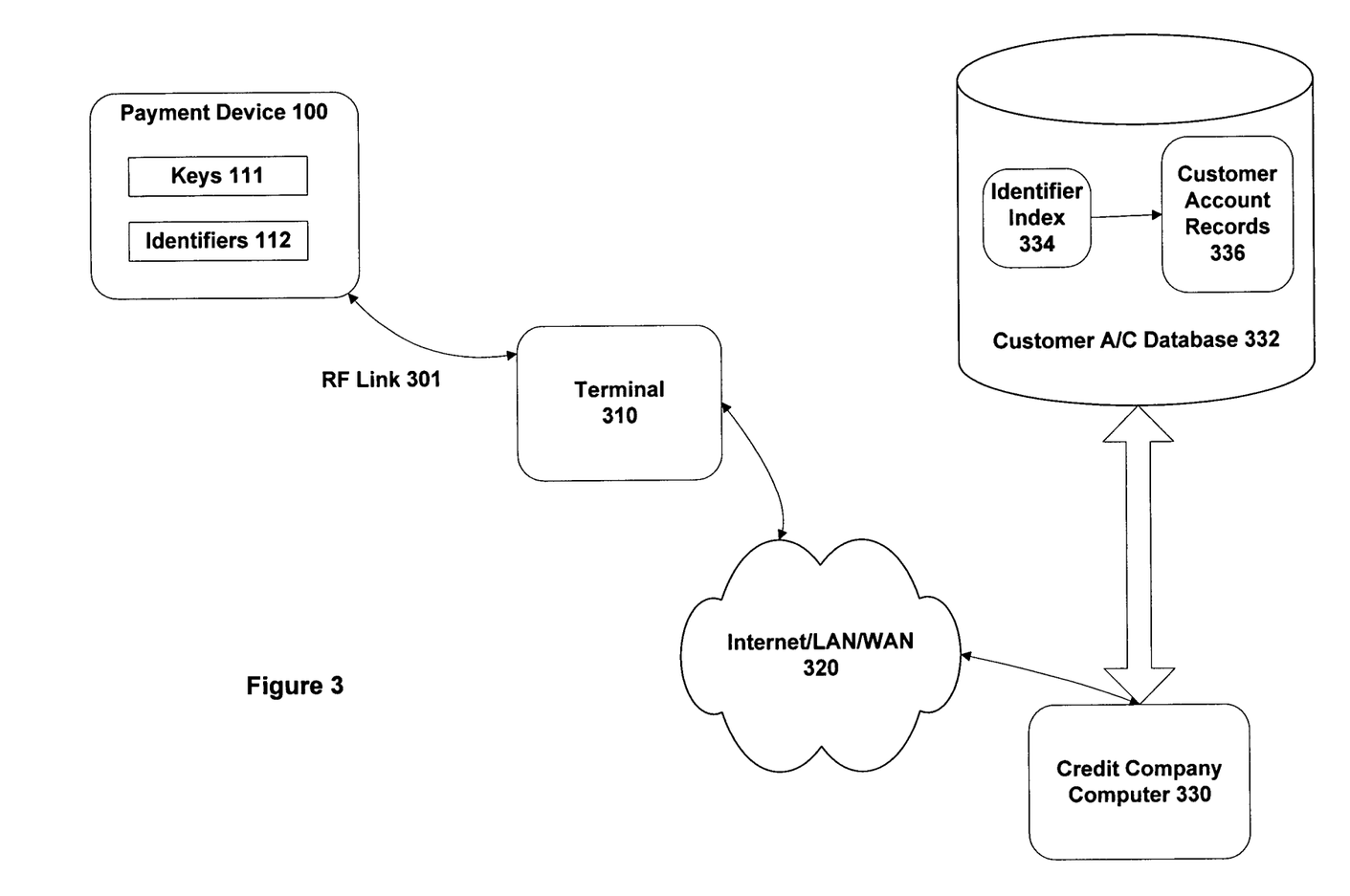
FIG. 3 is a schematic diagram illustrating the entities involved in opening or using an account in accordance with one embodiment of the invention.

It is now assumed that payment device 100 has been issued to a customer, and physically implanted into the customer (if appropriate). At this stage the payment device 100 typically carries certain information, such as programs to allow operation, but no details specific to any particular financial accounts. The procedure for then opening an account using payment device 100 in accordance with one embodiment of the invention is illustrated in the flowchart of FIG. 2. FIG. 3 schematically depicts the various entities involved in the operations of FIG. 2. Note that the operations shown in FIG. 2 may potentially be incorporated into the procedure associated with the initial implantation or issuance of the payment device, or they may be performed at some subsequent time.

The processing of FIG. 2 starts with the customer attending a terminal 310 associated with an organisation that is trusted by both the customer and the credit company (step 210). Such a terminal might typically be located at the customer's bank. The customer provides to the bank staff the information needed by the credit company to run the account, such as the customer's name, address, and so on. This will generally involve providing supporting documentary evidence of the type normally required to open a financial account, such as a driving license, etc. (step 220). Note that as a further precaution, the customer may be sent some particular piece of information, such as a one-time activation PIN, through the regular mail to the specified customer address. In order to activate the new account, the customer then has to call through to the credit company with this PIN.

Data to be used in running the account, in particular the customer name and address, is then sent to the credit company computer 330 by any appropriate route, for example by using a conventional computer terminal with keyboard and display. The credit company now has to authorise opening of the account for this customer (step 230). The credit company may perform this authorisation themselves, using the customer information supplied to them, and/or they may rely upon one or more third party organisations to perform the authorisation. One possibility is for the bank itself to perform the authorisation, for example if the person involved is already a known customer of the bank, and then to transmit the result to the credit company.

Assuming that the authorisation process is successful and the customer is accepted, the bank allows the customer to access the terminal 310 in order to open the account (step 240). The customer then arranges for the payment device 100 to engage the terminal 310, which may involve the customer positioning himself or herself so that an implanted payment device is properly located within the terminal. The payment device 100 is now powered up, enabling it to communicate with the terminal 310 via RF link 301. The terminal itself is linked to credit company's computer(s) 330 over network 320, which may comprise the Internet, an extranet, an intranet, a local or wide area network (LAN/WAN), and so on. Thus the combination of RF link 301, terminal 310 and network 320 supports communications between payment device 100 and the credit company computer 330.

Credit company computer 330 includes a customer account database 332. This may form part of computer 330 itself, or it may be a separate machine connected to computer 330 by an appropriate form of network link (local or remote). Database 332 stores a set of customer account records 336. As part of opening the customer account, the credit company computer creates a new record for the customer in database 332, including information such as the customer name, billing address, and so on.

In order to support communications between the payment device 100 and the credit company computer 330, the payment device generates a random number to use as a seed. This random number may be derived from a unique read-only number stored into non-volatile memory of the payment device at the time of issuance or implantation of the payment device. The seed is calculated from this stored number, dependent upon one or more random (or pseudo-random) variables, such as the precise response time of the customer to a query at the bank's terminal, or the level of thermal noise in some electronic device.

The payment device uses this seed to create paired public and private keys for use in a public key (i.e. asymmetric) encryption scheme. The skilled person is aware of a range of public key encryption schemes that might be used in this context, such as the well-known RSA algorithm. The payment device 100 stores the key pair into the key storage portion of its non-volatile memory 110 (shown as keys 111 in FIG. 1). In this manner, the payment device can use a different key pair for each new account to be opened on the device, although in some embodiments, the same key pair may be used for all operations of the payment device. In the latter case, the key pair can be generated and stored into non-volatile memory 110 when the payment device is initially issued or implanted.

The credit company computer 330 also determines a public and private key pair to be used with the new account. This may be the same key pair that is used by the credit company for all accounts, or the credit company may generate a separate key pair for every account. (The latter approach ensures that any accidental disclosure of one of the private keys of the credit company would not endanger the security of every customer account).

The payment device 100 and the credit company computer 330 now exchange their respective public keys using the bank terminal as an intermediary (step 250). The payment device stores the credit company public key into non-volatile memory 110. Likewise, the credit company computer stores the public key for the payment device 100, as well as its own key pair for these communications, into the customer record 336 for the new account. (Note that the payment device 100 and/or the credit company computer 330 may incorporate some form of special, secure storage for holding their respective private key(s), in order to ensure that these are not externally accessible).

Next, the credit company computer 330 generates a set of numbers for the payment device to use as identifiers (step 260). In one embodiment, the identifiers represent a set of (truly) random numbers, produced by a special purpose random number generator, as known in the art. Another possibility is that the numbers are pseudo-random, created using a cryptographically secure algorithm with a seed known only to the credit company. Typically, the credit company computer checks that every identifier is unique, so that no identifier is allocated to more than one customer.

However, there may be other ways of uniquely specifying a customer (for example, by a combination of identifier and public key). The credit company computer 330 stores the set of generated identifiers in the customer account record 336. The generated identifiers are also transmitted via the terminal 310 to the payment device (step 270), which stores them in its non-volatile memory 110 (shown as identifiers 112 in FIG. 1).

The credit company computer also creates an index 334. This maps in a computationally efficient manner from each identifier to the customer account record associated with that particular identifier. The index then allows the credit company computer to quickly determine the relevant customer account from any supplied identifier.

Note that in an alternative embodiment, the payment device 100 is responsible for generating the set of identifiers (instead of the credit company computer 330). The identifiers are then transmitted from the payment device 100 to the credit company computer 330, which stores them as before. However, it may be beneficial for security reasons (discussed below) if the payment device does not include a mechanism for the mass read-out of identifiers. In this case, making the credit company computer 330 responsible for initially producing the identifiers can be regarded as more secure.

Irrespective of where the identifiers are generated, they are stored in both payment device 100 and in customer account database 332 prior to the credit account to be opened. The use of the payment device 100 to then perform a transaction, such as a credit card purchase, in respect of the opened account, is illustrated in the flowchart of FIG. 4.

Figure 4:
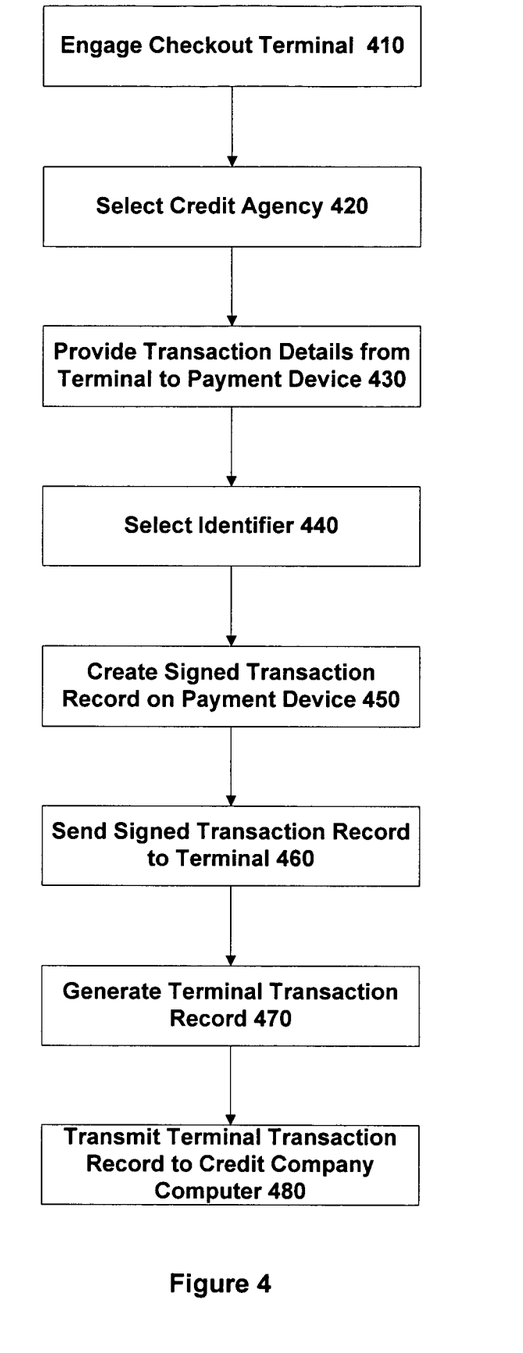
FIG. 4 is a flowchart illustrating the use of a payment device to make a transaction in accordance with one embodiment of the invention.

The entities involved in the operations shown in FIG. 4 are basically the same as those illustrated in FIG. 3. However, as will become apparent in more detail below, there are generally two classes of terminal. The first class is able to manipulate accounts, such as opening an account (as shown in FIG. 2), or modifying details associated with that account. A terminal belonging to this first class is generally at a trusted location, such as a bank. The second class of terminal is not normally able to manipulate account information, but rather can be used to perform standard consumer transactions (such as shown in FIG. 4). A terminal of this class is typically located on the premises of the merchant with whom the transaction is being performed (e.g. a retailer), and may be incorporated into a shop checkout facility.

For the flowchart of FIG. 4, it is assumed that the customer has already selected various items to purchase, and has taken the items to the retail store checkout. The shop attendant has then generated a bill, for example by scanning the selected items, and the checkout computer is now displaying the bill total to the customer for acceptance. It will be appreciated that up until this point, the operations correspond to those with an existing credit card.

Assuming that the customer accepts the bill total, he or she proceeds with payment. To this end, the payment device 100 is engaged with the checkout terminal 310 (step 410). If the payment device is an implant, this may be achieved by positioning the device at an appropriate location relative to the checkout terminal. In addition, if a wireless connection is being used for communications between the payment device 100 and the terminal 310, the customer may also be required to perform some positive physical action, such as pressing a button on terminal 310, in order for proper engagement to occur. This then ensures that the payment device 100 and the terminal 310 do not start interacting simply because they are brought into proximity with one another (perhaps accidentally).

Once communications have been established between the checkout terminal 310 and the payment device 100, the next task is to establish which credit organisation will be covering the transaction (step 420). In one embodiment, the checkout terminal sends to the payment device a list of the credit organisations that the terminal supports. The payment device 100 maintains in non-volatile memory 110 a listing of credit organisations with which the customer has an account, and these are flagged in order of preference. The payment device then reviews the listing received from the checkout terminal, and returns to the terminal the identity of the supported credit organisation that has the highest preference with the customer. Optionally this is displayed to the customer, who is asked to accept this selection. (If the selection is not accepted, the payment device scans through the listing for the next highest preference).

In an alternative embodiment, the payment device sends its own listing of available credit accounts to the checkout terminal. This listing can be provided in general terms, for example by specifying agencies such as Visa, MasterCard, and so on, and therefore does not compromise the identity of the customer. Next, the terminal 310 identifies those credit organisations in the listing that are also supported by the merchant. The subset of mutually supported agencies may now be displayed to the customer, thereby allowing the customer to make the final selection of credit organisation for this transaction. Alternatively, the terminal 310 may now simply select the credit organisation from the customer listing that is most preferred by the merchant to handle this transaction. (The skilled person will be aware of various other suitable strategies that could be used for agreeing on an appropriate credit organisation).

Assuming that a mutually satisfactory credit organisation is decided upon, the checkout terminal 310 next transmits to the payment device a copy of the bill for the transaction (step 430). Various pieces of information can be included in the bill, but in general it is expected that at least the following will be present:

(a) the bill total;
(b) the credit account name (as agreed in step 420);
(c) the merchant identity, as known to the agreed credit organisation, and usually the identity of the particular store or premises in which the terminal is located;
(d) a unique ID allocated to this transaction by the merchant, to be used for its own records; and
(e) the current date and time.

The payment device now selects one of the installed set of identifiers for use with this transaction (step 440). Typically, the selection of an identifier is done in a random or pseudo-random manner. It will be recollected that each set of identifiers, as generated at step 260 in FIG. 2, is associated with a particular credit agency, and more especially with the account that this payment device has with the agency. Accordingly, the identifier for use in this transaction is selected from the set of identifiers corresponding to the credit agency previously determined at step 420.

The payment device 100 now adds the selected identifier to the bill details (e.g. by appending or prepending them). This generates a transaction record, which is then signed using a digital signature (step 450). Techniques for creating a digital signature are well-known in the art, and generally involve a two-step process. In the first step, some hash value is created, representative of the message to be signed. This hash value is then encrypted with the private key of the signatory in order to generate the digital signature.

The subsequent signature verification process involves a recipient (re)calculating the same hash value from message, and using the signatory's public key to decrypt the digital signature. If the message is genuine and uncorrupted, the recalculated hash value should match the value obtained by decrypting the digital signature.

In the present context, the payment device 100 therefore forms a message that combines the selected identifier for the transaction with the bill details received from the terminal 310. Other information may optionally also be included in the message. The payment device then determines a hash value for this message, and uses its private key (for use with this particular credit account) to generate a corresponding digital signature.

The signed transaction record, i.e. the message and associated digital signature, is then communicated back from the payment device 100 to the terminal 310 (step 460). In one embodiment, the transaction record is encrypted prior to such communication. Typically such encryption is performed using the public key of the credit organisation. Note that this public key may potentially be dependent upon the particular customer, in other words, different public keys may be provided to different customers. If this is the case, then the identifier can be retained outside the encryption process. Alternatively, a separate copy of the (unencrypted) identifier may be added to the (encrypted) signed transaction record at some predetermined position, such as at the start of the record. This information then allows the receiving credit organisation to determine which private key to use in decrypting the message (i.e. the credit organisation must use the private key corresponding to the public key given to the customer who is associated with the received identifier).

On receipt of the signed transaction record from the payment device, the checkout terminal forms a message to send to the credit company computer 330 (step 470). The terminal then transmits this message, representing the terminal transaction record, over network 320 to the credit company computer 330 (step 480). Note that the terminal transaction record sent from the checkout terminal 310 to the credit company computer 330 may simply represent the signed transaction record received from the payment device 100, or the terminal 310 may add any other desired information into the message. One possibility is for the terminal to include its own version of the bill details, especially if the device transaction record is encrypted, since these details can then be used for checking against those provided by the payment device 100 (if the device transaction record is not encrypted, the terminal may do such verification itself).

The checkout terminal may optionally encrypt and/or add its own digital signature to the terminal transaction record for sending to the credit company computer 330. The use of a digital signature by the checkout terminal 310 helps to confirm to the credit company computer 330 that the transaction is bona fide, rather than perhaps some forger trying to spoof the merchant's identity. If the checkout terminal 100 does encrypt the message to the credit company computer 330, this will generally be done with a public key assigned by the credit organisation to the merchant or to that particular terminal. This then permits the receiving credit company to determine which corresponding private key to use to recover the (unencrypted) message.

On receipt of the terminal transaction record, the credit company computer 330 extracts the selected customer identifier for this transaction, and uses this identifier to determine the particular customer involved in the transaction. The credit company computer is then able to access the appropriate credit company private key for this customer account, as well as the customer's public key. The former allows the received transaction record to be decrypted (if necessary), while the latter allows the digital signature on the transaction record to be validated.

It will be appreciated that as a result of the above processing there may be two layers of encryption used for the terminal transaction record, one from the terminal 310 on the outside, and the other from the payment device 100 on the inside. In one embodiment, the credit company computer 330 therefore receives a twice-encrypted transaction record message. Based on the identity of the merchant (as indicated for example by the network address from which the message originated), the credit company computer 330 selects a private key with which to decrypt the outer layer of encryption. This then allows the credit company computer to access the selected payment device identifier, and from this to determine the customer involved. Using index 334 and account records 336, the private key for decrypting the inner layer of encryption can now be obtained, thereby allowing the original device transaction record to be recovered.

Assuming that the digital signature on the transaction record is successfully validated, the credit company computer 330 generally performs some further verification on the transaction. This may include checking that the customer account involved has not been terminated, and that the amount of the transaction is within the account limit. The credit company computer 330 may also confirm that the bill details in the device transaction record match the bill details in the terminal transaction record (if separately provided).

The credit company computer 330 then enters details of the transaction into the customer record on database 332. This allows the credit company to maintain a history of all the transactions made on each individual account. This information is used to bill the customers as appropriate, as well as to resolve any possible dispute that may arise about a particular transaction.

In addition, the credit company computer 330 sends some form of acknowledgement or confirmation back to the terminal 310. This response may include a formal authorisation code (associated with a particular transaction ID), without which the merchant is unable to complete the credit transaction. The requirement for such a specific authorisation code may be limited to certain circumstances, for example, to transactions over a certain value. The response from the credit company computer 330 back to the checkout terminal 310 may itself be protected by a digital signature and/or encryption.

On receipt of the confirmation or authorisation from the credit company computer 330, the checkout terminal 310 is now confident that the transaction is valid. Accordingly, the credit customer can leave with the purchased goods. (The skilled person will be aware of more complex message acknowledgement and transaction authorisation schemes that could also be used, if so desired).

Figure 5:
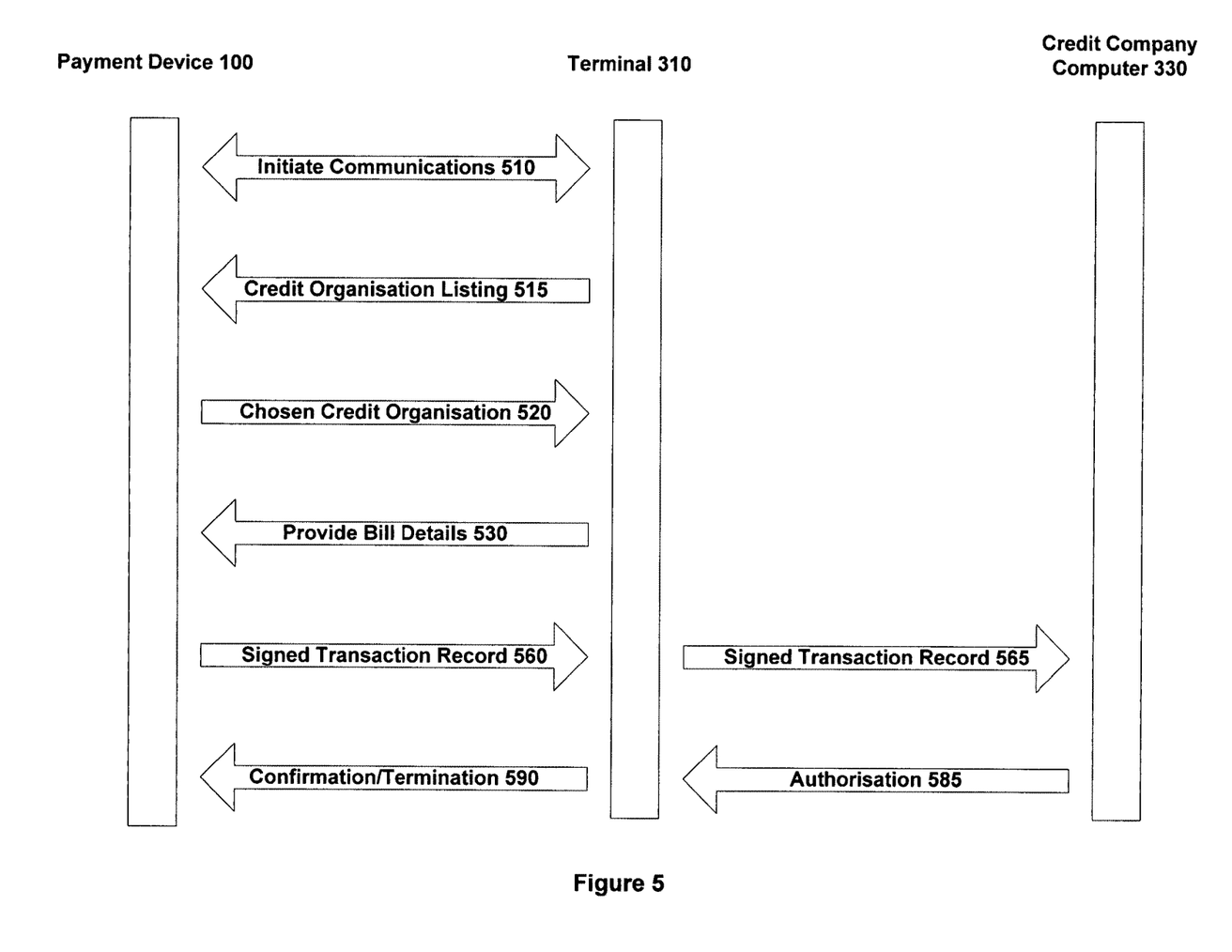
FIG. 5 is a schematic diagram of the message flows while using a payment device to make a transaction in accordance with one embodiment of the invention.

FIG. 5 illustrates the message flows between the payment device 100, the terminal 310, and the credit company computer 330, during a transaction such as illustrated in the flowchart of FIG. 4. Thus processing starts with communications between the payment device 100 and the terminal 310, in order to establish contact with one another for performing a transaction. The exact flow of these opening messages 510 depends on the specific communications protocol that is utilised, e.g. whether the opening message is sent from the payment device 100 to the terminal 310, or vice versa.

Next, the terminal 310 sends a listing 515 of the credit organisations that it supports, and receives a response 520 back from the payment device indicating the particular credit organisation to be used for this transaction. (As discussed above, there are various other possible message flows that could be adopted to perform this selection).

The terminal now provides bill details 530 to the payment device, specifying the amount to be paid, the date, and so on. In return, it receives a signed transaction record 560, in which the bill details 530 are supplemented by a selected identifier for this transaction and a digital signature from the payment device. The transaction record is then forwarded from the checkout terminal 310 to the credit company computer 330. The forwarded transaction record 565 may incorporate additional information compared to the transaction record 560 received from the payment device, such as a digital signature of the terminal 310.

Assuming that the credit company is prepared to allow the transaction to proceed, an authorisation message 585 is returned from the credit company computer 330 to the checkout terminal 310. The checkout terminal 310 is then able to send a confirmation message 590 to the payment device, thereby completing the transaction. Note that dependent upon the amount of memory 110 available, the payment device 100 may maintain its own on-chip history of transactions (such as the date, identifier used, amount involved, and a transaction ID, etc.).

It will be appreciated that in performing a transaction such as illustrated in FIGS. 4 and 5, the payment device has only provided one identifier out of many on the device. This identifier may be considered as being in lieu of the card number that is embossed on traditional credit cards. Existing card numbers generally identify the customer to a merchant, since the same card number is used for all transactions. Potentially this allows a merchant to develop a picture of the cardholder's lifestyle and behaviour, by tracking his or her purchases. For many consumers this represents an unwanted intrusion into their personal privacy.

In contrast, by having multiple identifiers with no apparent relationship between them, the merchant is unable to acquire information about the customer. Thus there is no way for the merchant to link two transactions involving the same customer, since in general they will have different identifiers. (It is assumed that the number of identifiers per customer is large, hence the probability of repeat usage is very low).

Note also that the public key adopted by the payment device for transactions on a particular account is not made available to the checkout terminal. Therefore, the terminal is not able to use this key in order to provide a linkage between different transactions involving the same customer. An added benefit of this is that it helps to prevent a rogue terminal from spoofing the credit company computer 330. Thus without knowledge of the relevant public key for the payment device, the rogue terminal cannot generate encrypted messages that appear to the payment device as if they originate from the credit company computer.

There are of course situations where the authorities have a legitimate need to ascertain the person involved in a particular transaction, perhaps, for example, to determine who purchased a gun used in a shooting. In this situation, the transaction records from the shop can be used to identify the credit account concerned, and from there the identity of the account holder may be accessed. However, the credit organisation is only like to make such information available providing due legal process is followed, such as by obtaining a court order. Consequently, this is likely to be a rather rare (and strictly controlled) occurrence.

The use of the payment device of FIG. 1 not only maintains the customer's privacy, but it also protects against a common type of fraud. Thus it is known today for a corrupt merchant to obtain a card number when a customer makes a bona fide purchase, and subsequently to pass through fraudulent transactions against this same card number. The use of multiple identifiers and a digital signature for the transaction record however prevents such actions, since for each bona fide transaction the merchant only obtains one genuine identifier and digital signature. If a corrupt merchant subsequently tries to put through fraudulent transactions against the same payment device, then he or she will not be able to generate the correct digital signature for the transaction (unless it is a precise replica of the original transaction, which of course would be immediately suspicious). Moreover, any such phoney transactions would have the same identifier as the original transaction, instead of a random spread of available identifiers, which will again indicate to the credit company that something is amiss.

A slightly different type of possible fraud is where the merchant displays one bill for the transaction to the customer, but presents another (larger) bill to the payment device for authorisation and payment. There are various ways to counter this. One possibility is to have the merchant print out and sign a copy of the bill (in contrast to the situation today, where it is the customer who signs). The customer can then retain this printed copy as evidence of the true amount of the bill.

Another protection strategy would be to enable the customer to access the transaction details as passed to the payment device without having to rely on the merchant's terminal. For example, if the payment device were not an implant, it could be provided with a small LCD screen to display the amount of the bill currently being authorised. Alternatively, the customer may have some other device, such as a PDA, capable of accessing the bill information from the payment device and displaying it to the customer (this might be used even if the payment device were an implant, for example by providing the PDA with an RF transceiver). This then allows the customer to confirm directly that the billed amount passed to the payment device is correct (along with any other relevant transaction details), rather than having to rely on the merchant's terminal. Once the customer is happy that this is indeed the case, payment of the bill can be authorised. Since the transaction record then generated by the payment device incorporates a digital signature, it is protected against any further alteration by the merchant (or anyone else).

Another potential avenue for fraudulent attack on payment device 100 is for a criminal to access the payment device without the customer knowing (this general presupposes that the interaction with the terminal is via a wireless connection). However, this requires the criminal to register the terminal with the credit company (or to emulate or steal an already registered terminal). The credit company may then be able to detect the fraud on the basis of an unusual set of transactions from a particular terminal. Moreover, there are also counter-measures that would render this type of fraud very difficult from a purely physical perspective, such as by limiting the ability of payment device 100 to communicate externally except at very short range.

A criminal may also possibly seek to intercept communications between the payment device and the terminal, and/or between the terminal and the bank. However, since a digital signature is incorporated into the transaction record once it leaves the payment device, it is hard to see how this could benefit the criminal.

The number of identifiers assigned to any given customer by the credit company is dependent upon the particular circumstances, but can easily be large—for example, 100, 1000, or more. Thus if we consider a credit company with potentially 1000 million customers, and each customer being allocated 1000 identifiers, this requires at least a 40-bit identifier to ensure uniqueness—i.e. to provide a minimum of a million, million different identifiers. Using 64-bit identifiers in such a situation then ensures that the adopted identifiers are sparse (and so very difficult to guess), and requires 8 Kbytes in non-volatile memory 110 to store the total set of identifiers for any one customer. It will be appreciated that this 8 Kbytes size is well within the capabilities of current technology, which can readily provide megabytes of storage on a single chip. Additional storage may therefore be used, if desired, to support longer identifiers, an increased number of identifiers per customer, and/or multiple sets of identifiers on a single payment device (typically one set for each credit account supported by the payment device).

Note that the storage for the identifiers 112 should be secure, in that general external access to the set of stored identifiers is prevented, irrespective of how a merchant's terminal 310 is programmed. There are two main reasons for this. Firstly, if an external terminal could readily obtain the completely set of identifiers from a payment device, this would provide a mechanism for unambiguously identifying the payment device, and so tracking its usage. Secondly, obtaining the complete set of identifiers may also help to disguise fraudulent usage of the card, instead of the situation discussed above where a fake merchant has to make repeated use of a single identifier.

Accordingly, payment device 100 is designed so that only the processor 115 (or other relevant component) is able to extract a single identifier at a time for use in a given transaction. It will be appreciated that appropriate technology for such secure storage is already known, being used for example for storing private keys in existing smart cards. (Such a secure storage facility is also used as mentioned above for storing the private key(s) 111 on payment device 100, as well as for holding any other sensitive numbers, for example, any seeds used for generating key pairs).

As a further safeguard, the maximum read-out rate of identifiers 112 can be limited. For example, the payment device 100 may require a delay of at least 20 seconds or perhaps one minute between successive transactions. This prevents a rogue checkout terminal from rapidly launching a high number of (phoney) transactions with the same payment device in an attempt to discover all or most of the identifiers for the payment device. Thus by enforcing such a delay between successive transactions, the number of identifiers that will be supplied to a rogue checkout terminal in a realistic timeframe is extremely limited, and would therefore be of little benefit to a fraudster.

For each transaction involving payment device 100, it is important to ensure that the device 100 is used by the correct person, in other words, by the account holder as recorded in the customer records database 332. This helps to provide protection against misuse of payment device 100, for example, should it be lost or stolen. For existing credit cards, the main safeguard in this respect is normally provided by requiring a (written) signature of the card bearer at each transaction. However, such a signature allows the merchant to identify the customer (or at least to potentially link together transactions involving the same person).

Considering the situation where payment device 100 is implanted into a customer, in this case it can generally be assumed that the correct customer is responsible for a transaction. Thus when a customer opens an account and provides identity details to a trusted party, such as a bank (step 220 in FIG. 2), the implant is inextricably associated with (physically embedded into) the person whose identity has been established. Since it is hardly possibly for the implant to be subsequently lost or stolen, this association should remain valid through the lifetime of the implant. Consequently, no further verification that the payment device is being used by the correct person is necessary at the time of the transaction itself. The human activity involved in completing such a transaction can therefore be as minimal as the customer presenting his or her implant to the checkout reader (this might hopefully reduce checkout waiting times in stores).

One additional possible safeguard is for the merchant to confirm at the time of the transaction that the implant incision on the customer has properly healed. This assumes that the implant is located in a reasonably accessible spot (e.g. in the forearm), rather than being covered by many clothes. It also implies that there is a certain delay (perhaps a few days) between implantation of the payment device and its first use, this delay providing sufficient time for the implantation incision to heal. Consequently, if a criminal forcibly removes the implant from a victim for re-implantation into himself (or herself), the criminal is initially unable to use the stolen implant until the incision heals. This gives time for the relevant credit organisations to be notified of the theft, and so to terminate or inactivate the account(s) concerned.

It is possible that there is some public resistance to the use of an implant for payment device 100. Thus an implant may have negative connotations for certain people, suggesting perhaps that humans are being tracked like animals. This in turn may raise questions regarding civil liberties. However, such concerns should be mitigated by the use of multiple identifiers within the payment device. This ensures that only the account manager (i.e. the credit company) can associate the payment device with a particular customer. All other parties (and in particular merchants) are restricted to seeing a series of different identifiers that cannot be directly linked to the bearer of the implant (or to one another).

It will be appreciated that if the payment device 100 is not provided as an implant, then there will usually have to be a mechanism to ensure that the bearer of the payment device is legitimate (i.e. the payment device has not been lost or stolen and is now in the hands of some unauthorised party). One way of achieving this is to utilise a PIN. Although such use of a PIN in conjunction with the payment device may be regarded as slightly more cumbersome for the customer (compared to having an implant), nevertheless, the identity of the customer should remain secure. Thus in operation, the terminal itself does not need to access or store the PIN; rather, the PIN entered by the customer is passed directly from the terminal to the payment device. This then allows the payment device to compare the entered PIN against cryptographically stored data on the payment device, in order to confirm that the appropriate party is using the device. (It will be appreciated that this is analogous to the way in which some existing smart cards validate transactions).

Note a PIN may potentially be required for use with the payment device even if the device is an implant. This might typically occur for transactions in which no other human is involved. For example, a customer might be requested to enter a PIN as an additional security precaution when the payment device is being used to access cash from an automated teller machine (ATM).

Although the bearer of payment device 100 will normally disclose his or her identity to the credit or financial institution providing the account, this is not necessarily the case. In particular, the customer may be able to preserve complete anonymity if payment device 100 is only used for debiting from a prepaid account. Thus returning to FIG. 2, let us assume that the customer makes a prepayment to a bank or financial institution, rather than disclosing his or her identity. The bank then opens the account for the customer, and credits the account with the amount of the prepayment (the account may be either at the bank itself, or at some third party service provider). The remaining steps for opening the account are then as previously described in FIG. 2 (exchanging keys and identifiers, and so on).

Since the account manager (the bank or other agency) has received funds in advance, it has no absolute reason for knowing any details (name, address, etc) of the customer involved. Rather, for each transaction involving the payment device, the account manager simply deducts the billed amount from the prepaid account, and passes this money to the merchant responsible for the transaction. The customer may perhaps make additional payments into the account by returning to the bank and adding cash, or via any other appropriate mechanism (cheque, credit card, and so on). If/when the account is finally exhausted, the account manager refuses to authorise any further transactions. (In some respects therefore, the account can be considered as operating in a similar fashion to Pay As You Go mobile telephones).

Note that with this approach, the prepayment funds are stored in the customer account records 336, which are managed by a trusted party, rather than on the payment device itself. Consequently, even if the payment device were lost, a customer may be able to recover unspent funds. This is of course subject to various security procedures, in order to establish that the person (re)claiming the unspent funds is properly entitled to them. One potential mechanism for achieving this is for the credit company to provide a printed reference number to the customer when the account is opened. The customer keeps this reference number safe at home. Should the payment device be lost or stolen, the customer can then recover the prepaid account money by using this reference number (that only they have access to).

It will be appreciated that having the account balance stored on computer 336 also makes it difficult to generate large numbers of fake or duplicate cards, since they must all link back to a bona fide account on database 332. Consequently, the maximum possible exposure of any given prepayment account to fraud is therefore limited to the balance maintained in the account.

Although FIG. 4 depicts the operations typically involved in an in-store transaction, payment device 100 may also be used for remote transactions over the Internet, such as for making a mail order purchase from a merchant's web site. In this case, a terminal for reading the payment device may be attached as a peripheral to the client computer used by the customer and connected to the Internet. Assuming that suitable software is installed on the client computer, the terminal peripheral acts as a local interface to the payment device for the merchant. Thus typically the bill details for a transaction are presented on the computer screen for approval by the customer. After the customer has taken the appropriate action to approve (e.g. by clicking in an "I Accept" box), the bill details are transferred from the client computer via the terminal to the payment device. The remaining procedure for making the transaction is then generally similar to that outlined in the flowchart of FIG. 4 (i.e. an identifier is selected to generate a signed transaction record, which is sent via the terminal, the customer computer, and the merchant web site to the credit company computer).

Note that as with a transaction in a retail store, the terminal itself does not need to be able to access the identifier from the payment device. Rather, the identifier is only included in the signed customer transaction record sent from the payment device through the terminal to the credit company. Accordingly, such a terminal would not assist someone who seeks to extract multiple identifiers from a payment device for fraudulent purposes.

Of course, in most mail order transactions, the identity of the customer is necessarily divulged to the merchant, such as by specifying a home delivery address. One possible way to avoid this is for the merchant to transmit the ordered goods to the credit company, and to include information such as the allocated transaction ID. The credit card company can then forward the goods to the customer associated with the account on which the transaction was made. With this approach, the customer identity can be retained from the merchant, although the delivery is likely to take longer, and to be more expensive.

On the other hand, in some Internet transactions, the identity of the customer is not necessarily disclosed to the merchant, for example when a payment is being made to download data stored on the Web (e.g. a music file). In these circumstances, where the customer identity cannot be confirmed by an address, the merchant web site may perhaps require the customer to enter a PIN number into the terminal in order to authorise the transaction, or else to perform some other authorisation procedure.

Another possible approach to remote transactions is for a customer to have a terminal, whether portable or connectable to a computer, that allows access to an identifier in the payment device. (As discussed above, this would not have the facility to provide rapid access to multiple identifiers, in order to maintain the secrecy of the set of identifiers as a whole). The customer then obtains an identifier to supply as part of a remote transaction over the telephone or computer, in place of the credit card number typically used today. Of course, there are certain potential security concerns associated with making a transaction in this manner. However, since similar concerns already exist for remote purchases based on a credit card number today, the skilled person is aware of various counter-measures that might be taken. (For example, delivery may have to be to an account address, or the credit company may contact the customer with verification questions before authorising the transaction).

In some circumstances, a customer may desire to close an account on payment device 100 (perhaps because another credit company is offering lower interest rates). Typically this can only be done at the same type of terminal used to open an account, i.e. the first class of terminal mentioned above (one that can manipulate account information, and which is generally at a trusted location, such as a bank). This then avoids the risk of a customer having their payment device mistakenly closed when making an ordinary merchant transaction.

In closing the account, the terminal wipes the information from the payment device, storing zeroes (for example) in the fields previously used for the identifiers and the public and private keys for the account. This removes any link between the customer and the credit account, so that the identity of the former can no longer be determined from the payment device itself. Of course, the credit company still has its customer records 336 as stored in database 332, so it is able to contact the customer should there be any outstanding deficit on the account.

Closure of the account may also be initiated by the credit company, perhaps if the customer does not provide settlement for transactions, or otherwise misuses the payment device. One way to achieve this is by refusal to authorise any further transactions using the payment device. The credit company may also wish to physically (re)-acquire the payment device (perhaps locking it in a terminal). However, the legitimacy of this will depend upon ownership of the device; for example, was the device originally issued by the credit company concerned, or is the credit company account simply one of many that the customer has installed onto the payment device.

As a further precaution, it is also possible to provide the payment device (or specific account) with an inherent expiry date. Once this date has expired, the customer may have to obtain a new payment device, or possibly to re-activate the account, such as by repeating the procedure shown in FIG. 2. (It will be appreciated that if anyone has stolen the payment device, they are unlikely to turn up to a trusted location to try to re-activate it).

Rather than closing the account, a customer may also instead want to generate a new set of identifiers to be used with the payment device (perhaps if a very large number of transactions has been performed with a single merchant). Typically this reset is performed by the customer placing the payment device in a terminal. This allows the payment device to communicate with the credit company computer 330, thereby enabling a new set of identifiers to be generated and installed (corresponding to steps 260 and 270 in the flowchart of FIG. 2). Again, the terminal utilised for resetting the identifiers would be of the type that permits account manipulation.

If the payment device is provided as an implant, then any broken or failed implant can be extracted with an operation similar to that used for the original implantation. A new implant can then be inserted, and will generally be re-programmed with the appropriate account information. Note however that the intrinsic failure rate of implants is expected to be quite low, since they are in a rather benign environment (e.g. constant temperature).

As a precaution, since people may come to rely on the implant always being available, some customers may opt to have more than one implant fitted (for example, one in each arm). This then provides redundancy should one of the implants fail. Typically the two or more implants for a customer would all be programmed to access the same account(s). In some implementations, the different implants would share the same set of identifiers and keys (most readily if the implants were all programmed together at the time the account was opened). Alternatively, each implant may have its own set of identifiers and/or keys to use for a particular account (provided the customer database 334 supports multiple sets of identifiers for a single account).

If multiple implants are present (and have the same account information installed), then any implant could be selected for use in a given transaction. Indeed, it would be sensible for the customer to use each implant regularly, in order to ensure that all the implants remain properly operational. This then allows implant replacement to be performed as soon as the first failure is detected. (In contrast, if one implant is used as a primary device, and another kept simply as a backup in case the primary fails, the fact that the backup implant has failed may not be detected unless and until the primary itself fails).

One potential failure mode for payment device 100 is where the data or program instructions stored in non-volatile memory 110 become corrupted. In order to minimise the risk of this happening, payment device can be designed so that non-volatile information may only be updated at a secure and trusted terminal, such as the first class of terminals discussed earlier. This class of terminal, typically located at a bank or other trusted location, could offer a range of account manipulation functions. On insertion of a payment device into the terminal, the terminal would then prompt the customer to select the desired service, such as opening or closing an account, resetting identifiers, or perhaps re-programming the payment device if some corruption has occurred. Note that the customer may have to (re)-establish their identity at the bank (or other organisation hosting the terminal) before some (or all) of these options are enabled.

In order to reduce the risk of device failure, two separate power circuits may be provided in payment device 100. The two power circuits can then be activated by different mechanisms (e.g. different AC supply frequencies and/or power levels, different physical contacts at the terminal, and so on). One of the power circuits can only be activated by the first class of terminals, which are used for account manipulation (opening, closing, etc.). Activation of this particular power circuit therefore enables account information such as the set of identifiers to be stored into non-volatile memory 110.

In contrast, the type of terminal found at a merchant or retail outlet can only activate the other power circuit. This second power circuit does not enable update or write operations to be performed on stored account information. This then ensures that important account data is protected from corruption during routine customer transactions.

Note that non-volatile memory 110 may be split if desired into different components. One component can be used to store account information, including keys 111 and identifiers 112, while another component can be used to maintain a record of data for each transaction (e.g. the amount spent). These two components may then be write-enabled by the first and second power circuits respectively. This allows the payment device 100 to be updated with certain information from a transaction, which the customer may desire for subsequent account verification, without compromising the safety of the basic account data on the device.

Another approach to reduce the impact of potential data corruption is for information (programs and data) stored into non-volatile memory 110 to be protected by an error correcting code (ECC). As is well-known in the art, some ECCs simply detect the presence of errors, while others have a (limited) ability to automatically correct errors. If the ECC facility detects some error in the integrity of the stored information, and assuming that it is unable to correct such error, it can render the payment device inoperative. If this happens, then typically the next time that the customer attempts a transaction with the device, the merchant terminal displays an error message. This may perhaps ask the customer to take the payment device to a re-programming terminal, such described above.

Alternatively, a backup copy of the information in question may be stored on the payment device. In this case, following detection of an ECC error, the backup copy may be utilised instead of the corrupted copy. (The integrity of the backup copy will also generally be protected by ECC).

It will be appreciated that ECC protection may only be applied to selected components within non-volatile memory 110, especially those of primary importance for proper operation of the payment device (e.g. the identifiers 112 and keys 111). In addition, ECC protection may also be applied to communications between the payment device and the terminal 310. To this end, an ECC facility may be incorporated into RF receiver 125 and RF receiver 130, as well as into their counterparts in the terminal (or into any other communications mechanism employed).

Although payment device 100 has been described generally in the context of retail transactions, analogous to existing credit card purchases, it may also be utilised in a wide variety of non-financial transactions, even if no payment is involved. The skilled person will be aware of a range of possibilities, based for example on current smart card applications. Thus the device might be used to gain access to computer resources or to certain secure physical locations in a building, or it may be used to associate medical records with the device bearer (each of these would then be considered as a transaction in the appropriate context).

In conclusion, a variety of particular embodiments have been described in detail herein, but it will be appreciated that this is by way of illustration only. The skilled person will be aware of many further potential modifications and adaptations that fall within the scope of the claimed invention and its equivalents.

The invention claimed is:

1. An apparatus for communicating with a first terminal and a second terminal distinct from the first terminal, each terminal communicatively coupled to a credit card company computer system, the apparatus comprising:
   an RF receiver and transmitter, a processor, and memory comprising a unique number and program instructions that when executed by the processor cause the processor to perform:
      generating, based on the unique number and one or more random or pseudo-random variables, a seed;
      creating, based on the seed, a public-private key pair, and storing the key pair in memory;
      exchanging, via an RF connection to the first terminal, public keys with the credit card company computer system, and storing the credit card company public key in the memory;
      receiving, via the RF connection with the first terminal, a plurality of identifiers associated with the credit card company and storing the identifiers in the memory;
      establishing communication with and receiving purchase data from, the second terminal, the purchase data comprising bill total, merchant ID, transaction ID, a date, and a time;
      selecting an identifier from the plurality of identifiers;
      generating a transaction record that includes the received data and the selected identifier;
      digitally signing, based on a private key of the key pair, the transaction record;
      encrypting, based on the public key from the credit card company computer system, the digitally-signed transaction record and transmitting the encrypted, digitally-signed transaction record to the credit card company computer via the second terminal; and
      receiving, via the second terminal, confirmation of completion of a transaction for the transaction record.

2. The apparatus of claim 1, further comprising: inert packaging.

3. The apparatus of claim 1, further comprising a first and a second power circuits.

4. The apparatus of claim 3, wherein the first power circuit and the second power circuit have different AC supply frequencies, power levels or physical contacts.

5. The apparatus of claim 3, wherein the second power circuit is for write-enabling the memory to store account information.

6. The apparatus of claim 1, wherein the program instructions when executed by the processor cause the processor to perform:
   storing, for distinct accounts, different key pairs for asymmetric encryption.

7. The apparatus of claim 1, wherein to perform said selecting the identifier from the plurality of identifiers, the program instructions when executed by the processor cause the processor to perform randomly selecting the identifier from the plurality of identifiers.

8. A method, comprising:
   generating, by a processor and memory of an apparatus, a seed, wherein the apparatus is for communicating with a first terminal and a second terminal distinct from the first terminal, each terminal communicatively coupled to a credit card company computer system, and wherein said generating the seed is based on a unique number stored in memory of the apparatus and one or more random or pseudo-random variables;
   creating, by the processor and the memory and based on the seed, a public-private key pair and storing the key pair in the memory;
   exchanging, by one or more components of the apparatus via an RF connection to the first terminal, public keys with the credit card company computer system, and storing the credit card company public key in the memory;
   receiving, by one or more components of the apparatus via the RF connection with the first terminal, and from the credit card company computer system, a plurality of identifiers, and storing the identifiers in the memory;
   establishing, by one or more components of the apparatus, communication with and receiving purchase data from, the second terminal, the purchase data comprising bill total, merchant ID, transaction ID, a date, and a time;
   selecting, by the processor and the memory, an identifier from the plurality of identifiers;
   generating, by the processor and the memory, a transaction record that includes the received data and the selected identifier;
   digitally signing, by the processor and the memory and based on a private key of the key pair, the transaction record;
   encrypting, by the processor and the memory and based on the public key from the credit card company computer system, the digitally-signed transaction record, and transmitting the encrypted, digitally-signed transaction record to the credit card company computer via the second terminal; and
   receiving, by one or more components of the apparatus via the second terminal, confirmation of completion of a transaction for the transaction record.

9. The method of claim 8, further comprising:
   storing, by one or more components of the apparatus, one or more credit organization preferences in the memory; and
   establishing, by one or more components of the apparatus and based on the one or more preferences stored in the memory, a credit organization of a plurality of credit organizations for the transaction.

10. The method of claim 8, wherein said selecting the identifier from the plurality of identifiers comprises randomly selecting the identifier from the plurality of identifiers.

11. The method of claim 8, comprising:
engaging, by one or more components of the apparatus, the apparatus with the first terminal and updating, by the one or more components, the account information stored in the memory of the apparatus.

12. The method of claim 8, comprising:
engaging, by one or more components of the apparatus, the apparatus with the second terminal and performing, by the one or more components, consumer transactions.

13. The method of claim 8, further comprising:
storing, by one or more components of the apparatus, and for distinct accounts, different key pairs for asymmetric encryption.

14. The method of claim 8, further comprising:
storing, by one or more components of the apparatus, the plurality of identifiers in a portion of the memory or
implementing, by one or more components of the apparatus, a maximum transaction rate for delaying a transaction.

15. The method of claim 8, further comprising:
selecting, by one or more components of the apparatus, different ones of the of the plurality of identifiers for at least some of a plurality of different transactions.

16. The method of claim 8, further comprising:
selecting, by one or more components of the apparatus, at least some identifiers of the plurality of identifiers for more than one of a plurality of different transactions.

17. A non-transitory computer-readable storage medium storing program instructions that when executed by a processor perform:
obtaining a unique number from a memory;
generating a seed based on the unique number and one or more random or pseudo-random variables;
creating, based on the seed, a public-private key pair, and storing the keys in the memory;
exchanging, via an RF connection to a first terminal public keys with a credit card company computer system, and storing the credit card company public key in the memory;
receiving, via the RF connection with the first terminal, and from the credit card company computer system, a plurality of identifiers, and storing the identifiers in the memory;
establishing communication with and receiving purchase data from, a second terminal, the second terminal distinct from the first terminal, the purchase data comprising bill total, merchant ID, transaction ID, a date, and a time;
selecting an identifier from the plurality of identifiers;
generating a transaction record that includes the received data and the selected identifier;
digitally signing, based on a private key of the key pair, the transaction record;
encrypting, based on the public key from the credit card company computer system, the digitally-signed transaction record, and transmitting the encrypted, digitally-signed transaction record to the credit card company computer system via the second terminal; and
receiving, via the second terminal, confirmation of completion of a transaction for the transaction record.

18. The non-transitory computer-readable storage medium of claim 17, comprising program instruction that when executed perform:
selecting at least some identifiers of the plurality of identifiers for more than one of a plurality of different transactions.

19. The non-transitory computer-readable storage medium of claim 17, comprising program instruction that when executed perform:
selecting different ones of the of the plurality of identifiers for at least some of a plurality of different transactions.

20. The non-transitory computer-readable storage medium of claim 17, comprising program instruction that when executed perform:
storing, for distinct accounts, different key pairs for asymmetric encryption.

* * * * *

UNITED STATES PATENT AND TRADEMARK OFFICE
CERTIFICATE OF CORRECTION

PATENT NO. : 10,679,452 B2
APPLICATION NO. : 10/654733
DATED : June 9, 2020
INVENTOR(S) : Williams Page 1 of 1

It is certified that error appears in the above-identified patent and that said Letters Patent is hereby corrected as shown below:

In the Specification

In Column 1, Line 63, delete "that that" and insert -- that --, therefor.

In the Claims

In Column 23, Line 22, in Claim 15, delete "of the of the" and insert -- of the --, therefor.

In Column 24, Line 31, in Claim 19, delete "of the of the" and insert -- of the --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*